United States Patent
Kato et al.

(10) Patent No.: US 8,348,258 B2
(45) Date of Patent: Jan. 8, 2013

(54) DRIVING FORCE TRANSMITTING DEVICE AND DRIVING FORCE TRANSMITTING MECHANISM

(75) Inventors: Shinichi Kato, Tama (JP); Masanobu Yamagata, Kawasaki (JP); Katsuhiko Hanagaki, Fujisawa (JP); Toshio Yanata, Ebina (JP); Tsuyoshi Hashiyada, Yamato (JP); Toshiki Yokoyama, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 118 days.

(21) Appl. No.: 12/868,948

(22) Filed: Aug. 26, 2010

(65) Prior Publication Data

US 2011/0049789 A1    Mar. 3, 2011

(30) Foreign Application Priority Data

Aug. 31, 2009   (JP) .................................. 2009-199746

(51) Int. Cl.
B65H 1/08   (2006.01)
B65H 1/00   (2006.01)

(52) U.S. Cl. ........................................ 271/127; 271/162

(58) Field of Classification Search .................. 271/156, 271/162, 127; 403/375, 109.3, 109.6; 464/120, 464/128, 112, 115, 116, 162, 169; 74/606 R
See application file for complete search history.

(56) References Cited

U.S. PATENT DOCUMENTS

| | | | | |
|---|---|---|---|---|
| 5,023,759 A * | 6/1991 | Eckenrode | ..................... | 362/524 |
| 6,146,280 A * | 11/2000 | Pulford, Jr. | ..................... | 464/112 |
| 7,497,434 B2 * | 3/2009 | Park | ............................... | 271/127 |
| 7,503,558 B2 * | 3/2009 | Kusumi | ......................... | 271/152 |
| 7,547,013 B2 * | 6/2009 | Matsumoto | .................... | 271/127 |
| 7,971,872 B2 * | 7/2011 | Omura et al. | .................. | 271/162 |
| 2003/0001330 A1 * | 1/2003 | Ohfuchi | ........................ | 271/162 |
| 2004/0256787 A1 * | 12/2004 | Wada et al. | ..................... | 271/109 |
| 2007/0001380 A1 * | 1/2007 | Kusumi | ......................... | 271/157 |
| 2007/0102868 A1 * | 5/2007 | Matsumoto | .................... | 271/127 |

FOREIGN PATENT DOCUMENTS

JP        3283189        3/2002
JP        2007-8720      1/2007

* cited by examiner

*Primary Examiner* — Patrick Cicchino
(74) *Attorney, Agent, or Firm* — Cooper & Dunham LLP

(57) ABSTRACT

A driving force transmitting device comprising: an output shaft which can output a rotating force, and a casing which supports the output shaft so that a leading tip part of the output shaft can expose the outside, wherein the output shaft is provided on the casing so that the tip end surface thereof is flash with or substantially flash with an outer surface of the casing or the tip end surface thereof is recessed interior of the outer surface, and wherein the tip end surface thereof is provided with an engaging part which is insertable/removable to/from an engaged part provided on a driven member.

5 Claims, 5 Drawing Sheets

DRIVING FORCE TRANSMITTING DEVICE AND DRIVING FORCE TRANSMITTING MECHANISM

CROSS-REFERENCE TO THE RELATED APPLICATION

This application is based on and claims the priority benefit of Japanese Patent Application No. 2009-199746, filed on Aug. 31, 2009, the disclosure of which is incorporated herein by reference in its entirety.

BACKGROUND OF THE INVENTION

1. Field of the Invention

The invention relates to a driving force transmitting device which gives a drive force to a driven member which does not have a drive force, by engaging itself with the driven member.

2. Description of Related Art

Traditionally, there exists a driving force transmitting device which gives a driving force by engaging the transmitting device with a driven member to which the driving force is applied.

As the driving force transmitting device, for example, as a driving force transmitting device comprising: a casing having a pair of opposing walls in which a supporting shaft projects from the other opposing wall toward a penetrated hole formed on one opposing wall of the pair of opposing walls; a transmitting gear which is supported in a state parallel to the supporting shaft in the casing and is rotated upon reception of the driving force; a joint gear which is supported by the supporting shaft to mesh with a transmitting gear and is configured to be movable along the supporting shaft in a meshing state; a leading tip part which protrudes from the penetrated hole being formed with an engaging part with respect to the driven member; an urging device which urges the joint gear to the protruding direction which passes through a penetrated hole from the casing; and a stopper which restricts a movement amount of the joint gear in a protruding direction along a supporting shaft thereof (For example, see JP-3283189-B).

As a driven member driven by such a driving force transmitting device, for example, there enumerates a paper feeding tray which is attachably/detachably configured to be mounted on an inkjet type or an electrophotographic type image forming device main body.

In this paper feeding tray, provided on an outer bottom plate of a box-shaped tray main body provided is an inner bottom plate whose one end is supported by an outer bottom plate. The input shaft which passes through between the other end of the inner bottom plate and the outer bottom plate and protrudes outside the tray is pivotally supported by the tray main body, a tongue-shaped lever is provided at a site positioned between the other end of the inner bottom plate and the outer bottom plate, of an input shaft, and an engaged part which engages with an engaging part of the driving force transmission device and one end protruding outside the tray, of the input shaft, is provided with an engaged part which engages with an engaging part of the driving force transmitting device.

The paper feeding tray constructed like this, the engaged part engages the engaging part, the tongue lever fixed to the input shaft pivots and lifts up the inner bottom plate by giving the rotational force of the driving force transmitting device main body to the input shaft side and paper sheets which is supported by the inner bottom plate is maintained at a predetermined height sufficient enough to feed the paper sheets to the image forming apparatus.

However, in the above-mentioned driving force transmitting device, since the shaft-like leading tip part of the joint gear is protruded from the penetrated hole and the protruded leading tip part is formed with an engaging part for engaging with the driven member, the driven member and the driving force transmitting device require a considerable depth length and it becomes one drawback to the downsizing of a product. Moreover, since a connecting length between the driven member and the driving force transmitting device is long, even if a slight displacement of the centering occurrences, such a long part of the connecting length flexes and absorbs the slight displacement of centering to connect both. A bending moment is likely to be applied to a joint gear. It is feared that the generation of deviated wear generates in a gear train within the casing including that joint gear and the occurrence of noise of the gear train are main causes of a failure. The invention was made taking account of the drawback and the failure, and an object of the invention is to provide a driving force transmitting device and a driving force transmitting mechanism, which can solve the above problems.

SUMMARY OF THE INVENTION

In order to solve the above-mentioned problems, the driving force transmitting device and the driving force transmitting mechanism employs the following special technical features.

According to one aspect of the invention, a driving force transmitting device comprising: an output shaft which can output a rotating force, and a casing which supports the output shaft so that a leading tip part of the output shaft can expose the outside, wherein the output shaft is provided on the casing so that the tip surface thereof is flash with or substantially flash with an outer surface of the casing or the tip end surface thereof is recessed interior of the outer surface, and wherein the tip end surface thereof is provided with an engaging part which is insertable/removable to/from an engaged part provided on a driven member.

According to another aspect of the invention, in the preceding aspect, wherein the output shaft is provided on the casing so that the tip end surface thereof is recessed interior of an outer surface of the casing, and wherein a peripheral part, of the tip end surface of the output shaft, of the casing is taped so that the engaged part of the input shaft is guidable to the tip end surface.

According to another aspect of the invention, in either the above two aspects, wherein the casing is composed of a front plate in which an insertion hole is bored, and a back plate which is disposed at a predetermined length from the front plate and a hole-shaped recessed part is formed on its front plate side of the back plate or its inner surface so that the recessed part is bored axially concentrically on a centerline of the insertion hole, and wherein the output shaft is supported by the casing so that the leading tip part is supported by the insertion hole, a base part opposed to the leading tip part is pivotally supported by the recessed part, and a gear part to which a rotational force from a drive part supported by the casing is transmitted is provided on the half way of the leading tip part and the base part.

According to another aspect of the invention, in the above invention, wherein an elastic member is internally inserted into the recessed part, and wherein the output shaft is elastically urged toward the front plate so that one side surface of the gear part is enabled to abut against an inner surface of the front plate.

According to another aspect of the invention, a driving force transmitting mechanism comprising: a driving force transmitting device in the first aspect, and a driven member.

According to another aspect of the invention, in the above aspect, wherein the engaging part includes an engaging hole having a predetermined depth, and a locking trench which is radially internally extended from the engaging hole at a predetermined depth shallower than that of the engaging hole, and wherein the engaged part includes an engaging shaft which is insertable/removable into/from the engaging hole, and a hooking pin inserted into the engaging shaft so as to protrude its both ends and be insertable/removable into/from the locking trench.

According to another aspect of the invention, in the preceding aspect, wherein a leading tip part of the engaging part is tapered, and wherein the engaging part and the engaged part are formed so that the depth of locking trench is axially shallower than the length from a base part of a ridge part formed by the chamfer to a position for inserting the hooking pin.

According to another aspect of the invention, in the above three proceedings, wherein the driven member is attachably/detachably internally mounted on an image forming device main body and is a paper feeding tray which storages paper sheets each of which is image-formed in the image forming device main body, and wherein the paper feeding tray is provided with an inner bottom plate which supports the paper sheets on an outer bottom plate and is configured to lift up one end of each of the paper sheets by rotating an input shaft part as the engaged part which is protruded outwardly and then changing an inclination angle of each of the paper sheets.

DETAILED DESCRIPTION OF THE PREFERRED EMBODIMENTS

Working Examples of a driving force transmitting mechanism of the present invention will be described below.

The driving force transmitting mechanism according to this working example shows by way of example a paper feeding tray as a drive member.

WORKING EXAMPLE 1

The driving force transmitting mechanism according to the working example 1 comprises a paper feeding tray 1 as a drive member and a driving force transmitting device 2.

Figure 8:
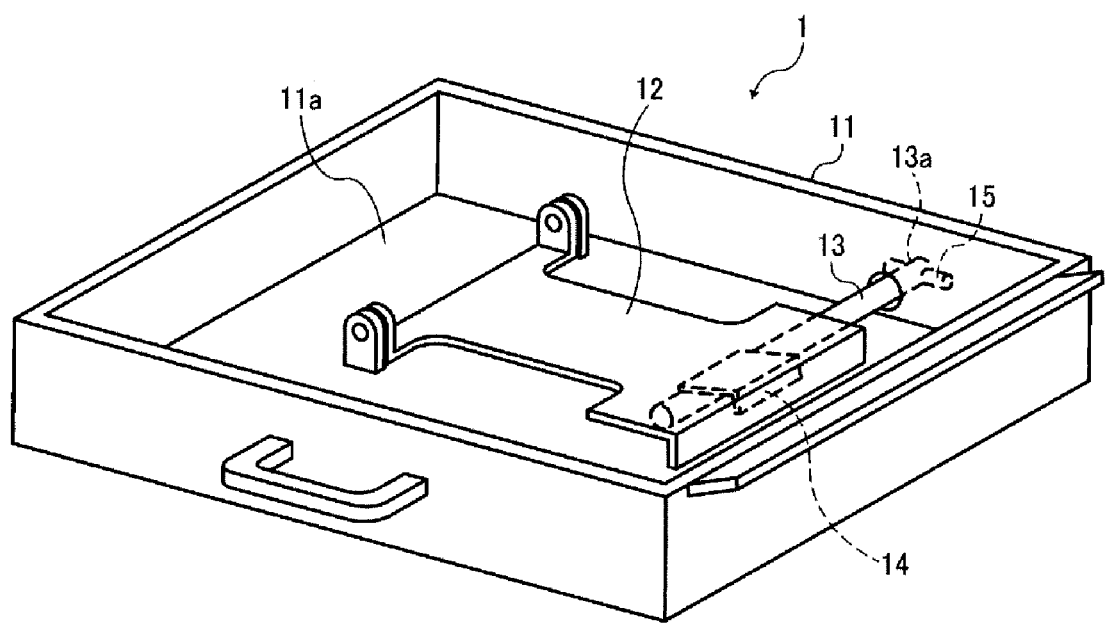
FIG. 8 is a perspective view of a paper feeding tray as a driven member.
Figure 9:
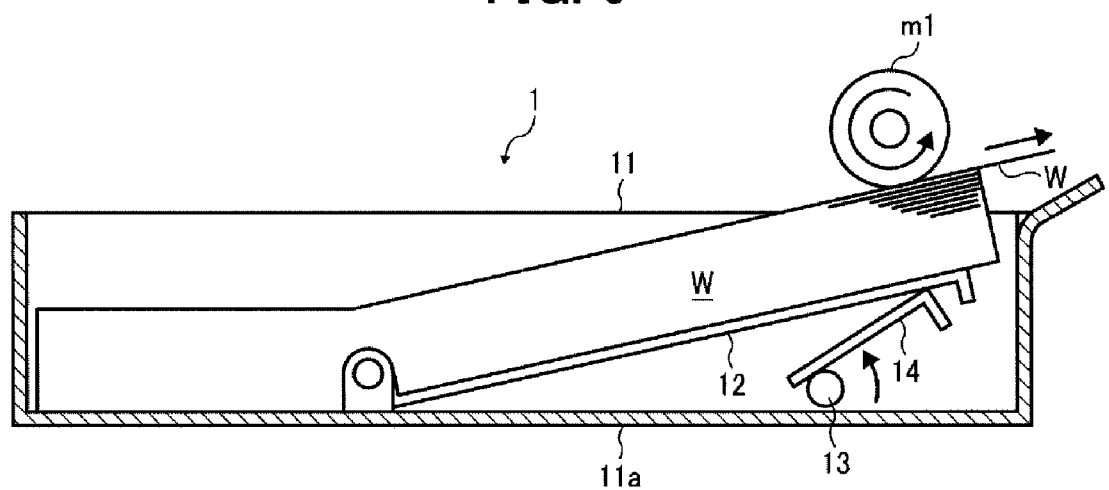
FIG. 9 is a vertical sectional view of the feeding tray as the driven member.

The paper feeding tray 1 includes, as shown in FIGS. 8 and 9, a box-like tray main body 11 with its upper portion opened, an inner bottom plate 12 with its one end being pivotally mounted on an outer bottom plate 11a of the tray main body 11, an input shaft 13 axially mounted on the tray main body 11 so as to pass through a space between the other end of the inner bottom plate 12 and an outer bottom plate 11a and thus extend outwardly of the paper feeding tray 1, a tongue-shaped lever 14 provided at a site positioned between the other end of the inner bottom plate 12 and the outer bottom plate 11a, of an input shaft 13, and an engaged part which engages with an engaging part of a driving force transmission device 2. Among any one of them, the engaged part includes a leading tip part 13a of the input shaft 13, as an engaging shaft, and a hooking pin 15 inserted through the leading tip part 13a so that its both ends extend outwardly from the leading tip part 13a.

The paper feeding tray 1 as arranged above, is configured to lift up a paper bundle W supported by the inner bottom plate 12 to a prescribed height when the driving force transmitting device 2 causes the input shaft 13 to rotate and then a tongue-shaped lever 14 fixed to the input shat 13 is rotated to raise the inner bottom plate 12. Then, a top paper sheet of the paper bundle W is fed into an image forming device main body by a paper feeding roller ml (FIG. 9).

Figure 1:
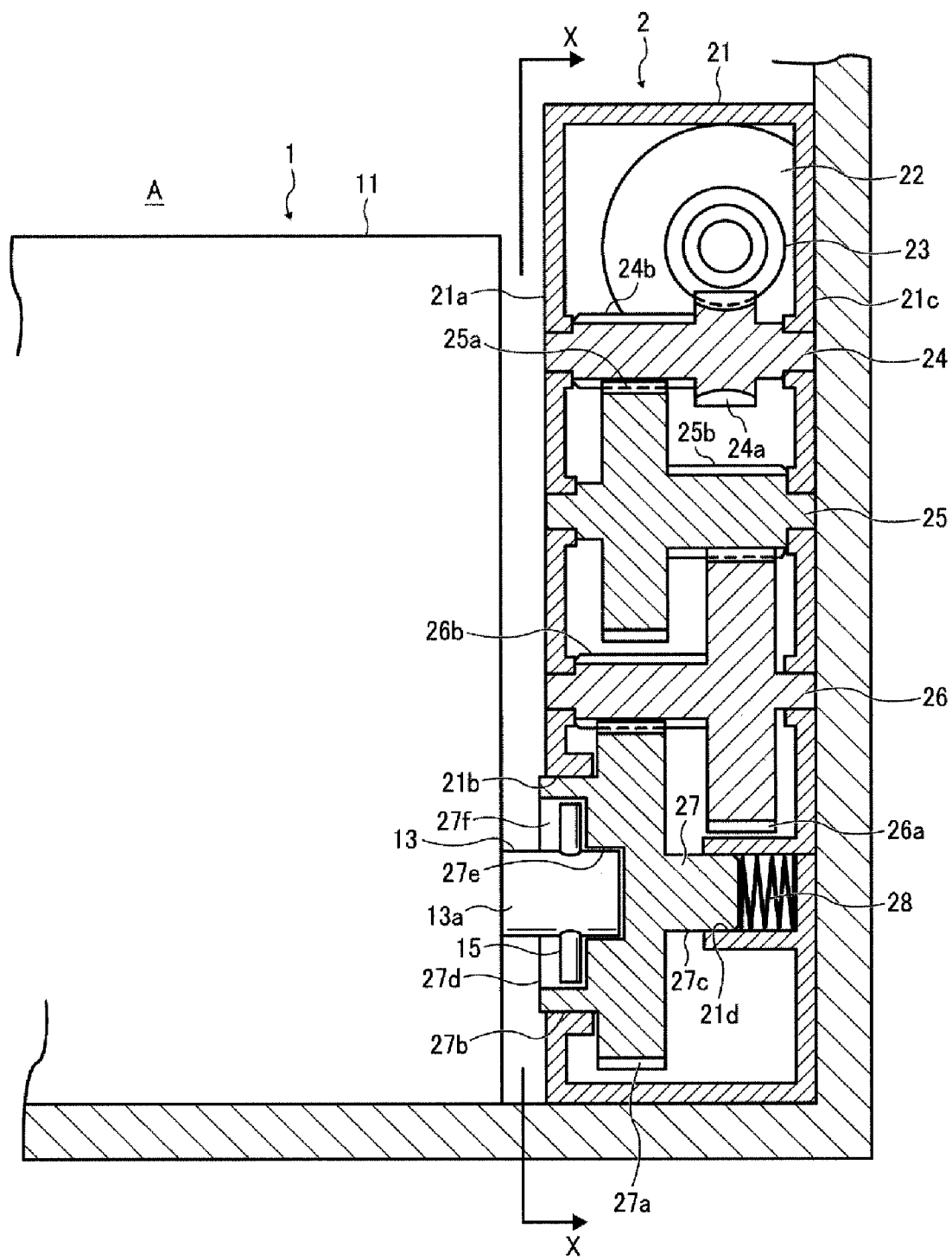
FIG. 1 is a vertical sectional view of a driving force transmitting mechanism according to a working example 1 of the invention.

The driving force transmitting device 2 includes a casing 21, a drive motor 22, and a gear train part, as shown in FIG. 1.

The casing 21 is composed of a front plate 21a, a back plate 21c, a top plate, a bottom plate, and both side plates and formed in a hollow box-shape by these plates. Further, an insertion hole 21b is bored through the casing 21 so that it communicates through a lower part of the front plate 21a and a hole-shaped recessed part 21d provided on a lower part of an inner surface of the back plate 21c so that it is bored axially concentrically on a centerline of the insertion hole 21b.

The insertion hole 21b is formed so that its hole diameter is larger than that of the recessed part 21d. In order to be capable of stably supporting the input shaft 13, an inner peripheral part of the insertion hole 21b is inwardly extended by a predetermined length. The axial width of an inner peripheral surface of the insertion hole 21b which becomes to be a pivotal support part of the output shaft 27 is formed to a broader than a thickness of a portion of the output shaft 27 next to the inner peripheral surface of the insertion hole 21b.

A drive motor 22 is such that its rotational axis rotates in synchronism with a pulse power and is mounted onto an upper portion of the casing 21 so that its rotation shaft is oriented in the direction of the corresponding side plate.

A gear train part includes a worm 23 mounted onto a rotation shaft of the drive motor 22, a first gear shaft 24 in which a worm wheel 24a configured to mesh with the worm 23 and a pinion gear 24b are continuously provided and both ends thereof are supported by the front plate 21a and the rear plate 21c, a second gear shaft 25 in which a spur gear 25a configured to mesh with the pinion gear 24b of the first gear shaft 24 and a pinion gear 25b are continuously provided and both ends thereof are supported by the front plate 21a and the rear plate 21c, a third gear shaft 26 in which a spur gear 26a configured to mesh with the pinion gear 25b of the second gear shaft 25 and a pinion gear 26b are continuously provided and both ends thereof are supported by the front plate 21a and the rear plate 21c, an output shaft 27 pivotally supported by the casing 21 so that a spur gear 27a configured to mesh with the pinion gear 26b of the third gear shaft 26 and as a gear part having the diameter of the tooth tip larger than the diameter of the insertion hole 21b is provided on the half way of the output shaft 27, a leading tip part 27b is pivotally supported by the insertion hole 21b and a base part 27c opposed to the leading tip part 27b is pivotally supported by the recessed part 21d, and a tip end surface 27d exposes outward and is flash with or substantially flash with an outer surface of the front plate 21a (In FIG. 1, the tip end surface 27d is slightly protruding from an outer surface of the front plate 21a), wherein the output shaft 27 is configured to rotate by the rotation shaft of the drive motor 22.

Figure 2:
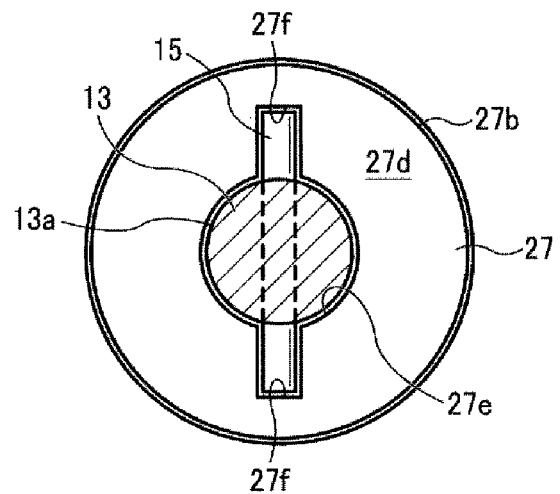
FIG. 2 is a transverse sectional view around a tip end surface around an output shaft taken along line X-X of FIG. 1.
Figure 3:
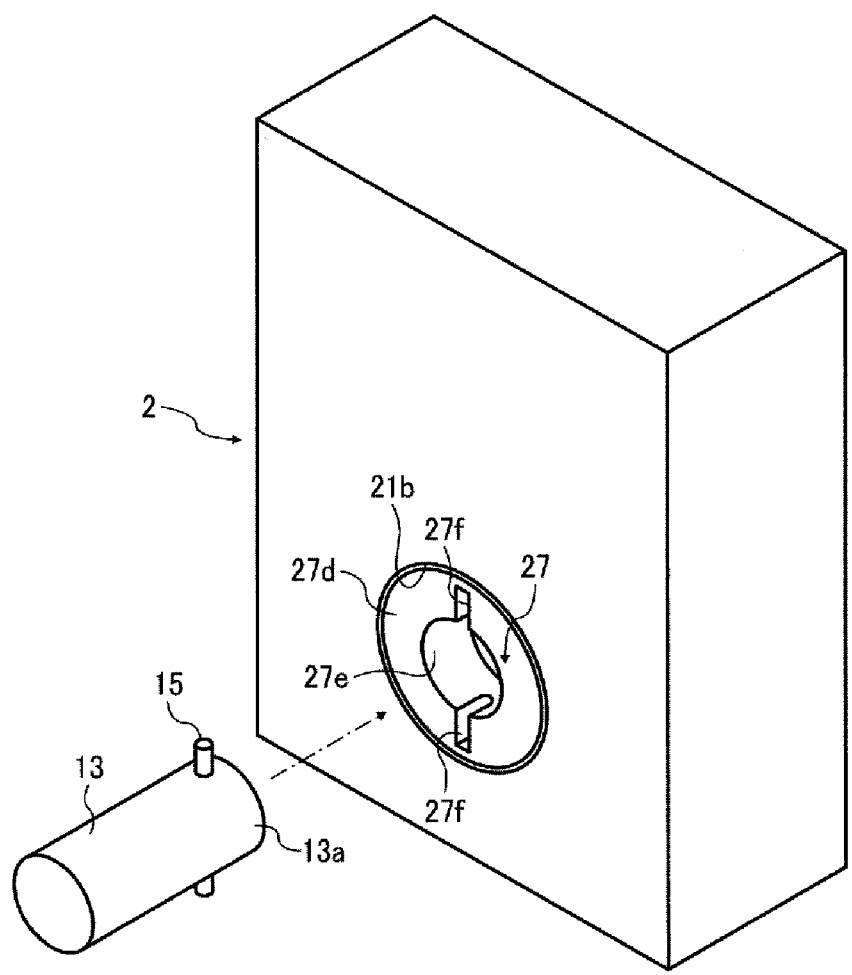
FIG. 3 is a perspective view of an engaged part and the drive force transmitting mechanism.

In the tip end surface 27d of the output shaft 27, as shown in FIGS. 1 to 3, the engaging part which is attachable/detachable to the engaged part as described above is recessed so as to be positioned interior of an outer surface of the front plate 21a. Namely, this engaging part is comprised of an engaging hole 27e of a predetermined depth into which a leading tip part 13a of the input shaft 13 in the paper feeding tray 1 is inserted and a locking trench 27f which is radially extended from the engaging hole 27e at a predetermined depth shallower than that of the engaging hole 27e and into which the hooking pin 15 is inserted.

Further, in the hole-shaped recessed part 21d formed on the rear plate 21c, an elastic member 28 comprised of a compression spring is internally inserted to the recessed part 21d. A side surface at the side of the front plate 21a of the spur gear 27a formed on the output shaft 27 elastically urges the output shaft 27 to come into abutment against an inner surface of the front plate 21a (FIG. 1).

In the driving force transmitting device 2 as constructed above, the output shaft 27 is mounted on a depth surface of a paper feeding tray reception part A formed on an inkjet type or an electrophotographic type image forming device main body, with the output shaft 27 becoming lower side, and is electrically connected to a control part of the image forming device main body. This paper feeding reception part A is configured not to be inserted except that the paper feeding tray 1 is not inserted into the right direction.

Further, as the above-mentioned paper feeding tray 1 is inserted into the paper feeding tray reception part A, the leading tip part 13a of the input shaft 13 as an engaging shaft is inserted into an engaging hole 27e and the hooking pin 15 is inserted into the locking trench 27f so that the hooking pin 15 is positioned within an axial width of the inner peripheral surface of the insertion hole 21b, thereby connecting the paper feeding tray 1 and the driving force transmission device 2.

This connecting process will be described in detail. The paper feeding tray reception part A makes the paper feeding tray 1 easy to be inserted into the paper feeding tray A by providing a certain degree of clearance with respect to the paper feeding tray 1. Since the leading tip part 13a of the input shaft 13 and the engaging hole 27e are disposed with each other in a certain extent so as not to occur a large amount of center deviation between the part and the hole, the leading tip part 13a of the input shaft 13 being inserted into the engaging hole 27e due to a certain degree of manual adjustment by an operator.

Figure 4:
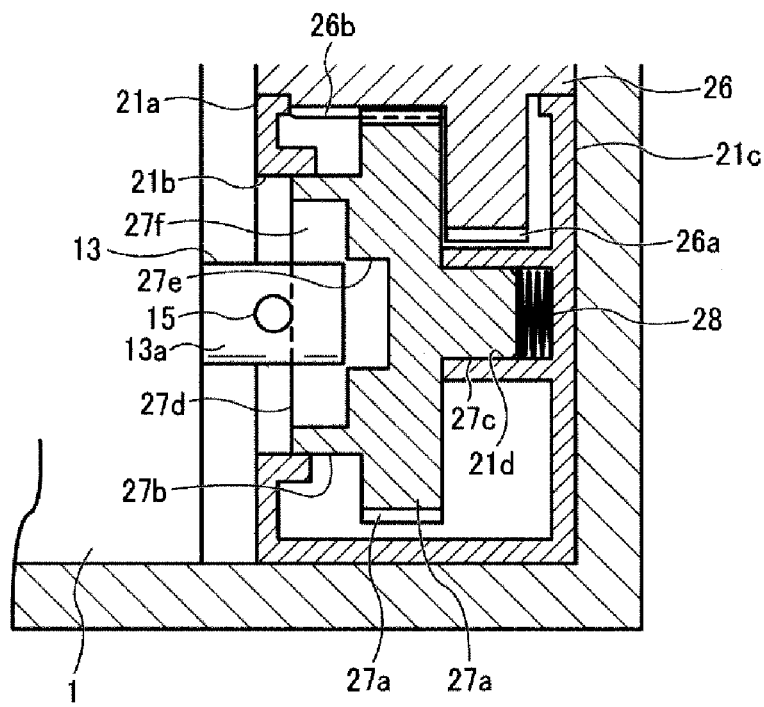
FIG. 4 is a vertical sectional view illustrative of a butting state between a hooking pin of the engaged part and the tip end surface of an output shaft.

On the one hand, since a phase shift between the hooking pin 15 and the locking trench 27f often occurs, when setting the paper feeding tray 1, the hooking pin 15 pushes, via the tip end surface 27d, the output shaft 27 which is urged by an elastic member 28 comprising a compression spring toward the back plate 21c (FIG. 4). At this moment, a sensor (not shown) detects a movement of the output shaft 27 (detects the arrival of the output shaft 27 at a predetermined position), using the detection as a trigger, a controller controls the drive motor 22 to rotate the output shaft 27 (the direction of rotation is such that the tongue-shaped lever 14 does not rotate). The output shaft 27 is rotated and then the hooking pin 15 is inserted into the locking trench 27f and substantially at the same time the output shaft 27 is returned to its original position and the detecting state by the sensor becomes non-detected state and the control part controls the drive motor 22 to stop the rotation of the output shaft 27.

As such, the output shaft 27 of the driving force transmitting device 2 and the input shaft 13 of the paper feeding tray 1 are connected and the paper feeding tray 1 is set to the paper feeding tray reception part A.

As you see, in the driving force transmitting mechanism according to the working example 1, since the output shaft 27 is provided on the casing 21 so that the tip end surface 27d of the output shaft 27 which is insertable/removable to/from the engaged part provided on the paper feeding tray 1 is substantially flash with the outer surface of the casing 21, it is possible to shorten the depth length of the paper feeding tray 1 and the driving force transmission device 2 as compared with the prior art driving force transmitting device 2 and thus contribute to the downsizing of a product.

Moreover, since a bending moment is not likely to be applied to a joint gear due to the shortage of the connecting length between the input shaft 13 of the paper feeding tray 1 and the output shaft 27 of the driving force transmitting device 2, it is expected that the generation of deviated wear and the occurrence of noise of the gear train can be reduced or suppressed.

WORKING EXAMPLE 2

Figure 5:
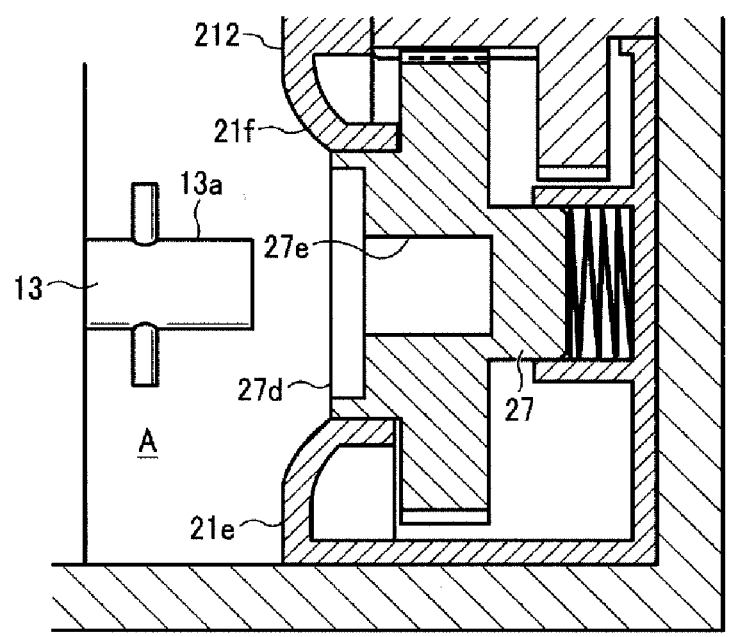
FIG. 5 is a vertical sectional view of the driving force transmitting mechanism according to a working example 2.

The working example 1 shows that the tip end surface 27d of the output shaft 27 and an outer surface of the front plate 21a are flash with each other or substantially flash with each other as a positional relationship between the tip end surface 27d of the output shaft 27 and the outer surface of the front plate 21a. In the driving force transmitting mechanism according to Working Example 2, as shown in FIG. 5, the output shaft 27 is fitted into the casing 212 so that the tip end surface 27d of the output shaft 27 is provided at the inner peripheral side of the outer surface of the front plate 21e and a peripheral part 21f of the tip end surface 27d of the front plate 21e is formed in a tapered shape so that the leading tip part 13a of the input shaft 13 as an engaging shaft is guidable to the tip end surface 27d.

In this way, since the tapered peripheral part 21f of the tip end surface 27d of the front plate 21a guides the leading tip part 13a of the input shaft 13 close to the engaging hole 27e when inserting the paper feeding tray 1 into the paper feeding tray reception part A, enhancement of improved workability can be expected.

WORKING EXAMPLE 3

The driving force transmitting mechanism according to the Working Example 3 shows by way of example the optimization in shape of the tip end part of the input shaft 13 and in dimensional relationship between the engaging surface and the engaged part.

Figure 6:
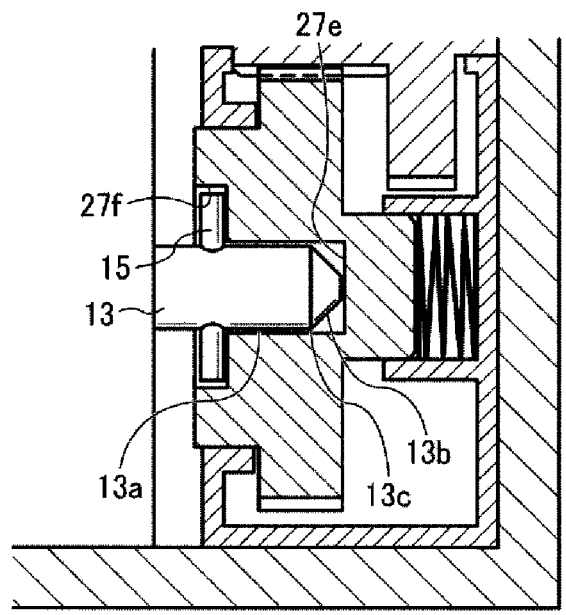
FIG. 6 is a vertical sectional view of the driving force transmitting mechanism according to a working example 3.
Figure 7:
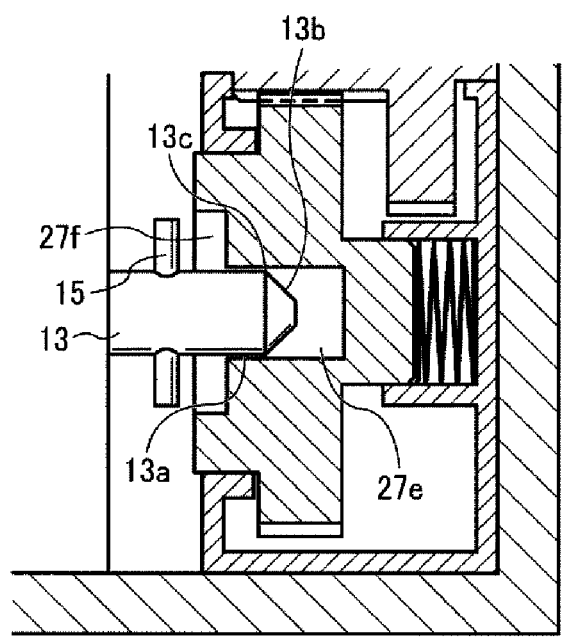
FIG. 7 is a vertical sectional view illustrative of a state during engaging between an engagement part and the engaged part of the driving force transmitting mechanism according to the working example 3.

Namely, the driving force transmitting mechanism according to the Working Example 3 shows by way of example as shown in FIG. 6 wherein the tip end surface 13b of the input shaft 13 is chamfered and the engaging part and the engaged part are formed so that the depth of locking trench 27f is shallower than the length from a base part of a ridge part 13c formed by the chamfer to a position for inserting the hooking pin 15. Constructed in this way, the chamfered tip end surface 13b of the input shaft 13 becomes a guide to the engaging hole 27e and thus facilitates the insertion and, as shown in FIG. 7, since the hooking pin 15 begins to fit into the locking trench 27f immediately after the leading tip part 13a of the input shaft 13 begins to fit into the engaging hole 27e, it is possible to smoothly perform both centering.

According to one aspect of the invention, wherein the output shaft is provided on the casing so that the tip end surface thereof is flash with or substantially flash with an outer surface of the casing or the output shaft is provided on a casing so that the tip end surface thereof is recessed from the outer surface of the casing, it is possible to shorten the depth length of the driven member and the driving force transmitting device as compared with the prior art driving force transmitting device and thus contribute to the downsizing of a product. Moreover, since a bending moment is not likely to be applied to a joint gear due to the shortage of the connecting length between the input shaft of the paper feeding tray and the output shaft of the driving force transmitting device, it is expected that the generation of deviated wear and the occurrence of noise of the gear train can be reduced or suppressed.

Although the driving force transmitting mechanism according to the Working Examples of the invention has been described, it is understood that the above-mentioned Working Examples each shows one of the preferred embodiments of the invention and thus the invention be not limited thereto, and it is believed obvious that modification and variation of the invention is possible without departing from the spirit and scope of the invention.

What is claimed is:

1. A driving force transmitting device comprising:
an output shaft configured to output a rotating force, and
a casing which supports the output shaft so that a leading tip part of the output shaft is exposed to an outside of the casing,
wherein the output shaft is provided on the casing so that a tip end surface of the output shaft is substantially flush with, an outer surface of the casing or the tip end surface of the output shaft is positioned inside the outer surface, and
wherein the tip end surface of the output shaft is provided with an engaging part which is insertable into and removable from an engaged part provided on a driven member, and
wherein a peripheral part, corresponding to the tip end surface of the output shaft, of the casing is tapered so that the engaged part of the input shaft is guidable to the tip end surface of the output shaft.

2. A driving force transmitting device comprising:
an output shaft configured to output a rotating force, and
a casing which supports the output shaft so that a leading tip part of the output shaft is exposed to an outside of the casing,
wherein the output shaft is provided on the casing so that a tip end surface of the output shaft is flush with, or substantially flush with, an outer surface of the casing or the tip end surface of the output shaft is positioned inside the outer surface, and
wherein the tip end surface of the output shaft is provided with an engaging part which is insertable into and removable from an engaged part provided on a driven member,
wherein the casing is composed of a front plate in which an insertion hole is bored, and a back plate which is disposed at a predetermined length from the front plate and a hole-shaped recessed part is formed on its front plate side of the back plate or its inner surface so that the recessed part is bored axially concentrically on a centerline of the insertion hole, and
wherein the output shaft is supported by the casing so that the leading tip part is supported by the insertion hole, a base part opposed to the leading tip part is pivotally supported by the recessed part, and a gear part to which a rotational force from a drive part supported by the casing is transmitted is provided on the half way of the leading tip part and the base part.

3. The device as claimed in claim 2,
wherein an elastic member is internally inserted into the recessed part, and
wherein the output shaft is elastically urged toward the front plate so that one side surface of the gear part is enabled to abut against an inner surface of the front plate.

4. A driving force transmitting mechanism, comprising:
a driving force transmitting device; and
a driven member;
the driving force transmitting device including
an output shaft configured to output a rotating force, and
a casing which supports the output shaft so that a leading tip part of the output shaft is exposed to an outside of the casing,
wherein the output shaft is provided on the casing so that a tip end surface of the output shaft is flush with, or substantially flush with, an outer surface of the casing, or said tip end surface recessed interior of the outer surface,
wherein the tip end surface of the output shaft is provided with an engaging part which is insertable into and removable from an engaged part provided on the driven member,
wherein the engaging part includes an engaging hole having a predetermined depth, and a locking trench which is radially extended internally from the engaging hole at a predetermined depth shallower than that of the engaging hole,
wherein the engaged part includes
an engaging shaft which is insertable into and removable from the engaging hole, and
a hooking pin inserted into the engaging shaft such that both ends of the hooking pin protrude and are insertable into and removable from the locking trench,
wherein a leading tip part of the engaging part is tapered, and
wherein the engaging part and the engaged part are formed so that the depth of locking trench is axially shallower than a length from a base part of a ridge part formed by the chamfer to a position for inserting the hooking pin.

5. The mechanism as claimed in claim 4,
wherein the driven member is attachably and detachably internally mounted on an image forming device main body and is a paper feeding tray which storages paper sheets each of which is age-formed in the image forming device main body, and
wherein the paper feeding tray is provided with an inner bottom plate which supports the paper sheets on an outer bottom plate and is configured to lift up one end of each of the paper sheets by rotating an input shaft part as the engaged part which is protruded outwardly and then changing an inclination angle of each of the paper sheets.

* * * * *